April 19, 1927.  1,625,431
W. S. ROSENFELD
ALIGNMENT DEVICE FOR AUTOMOBILE WHEELS
Filed Dec. 16, 1926
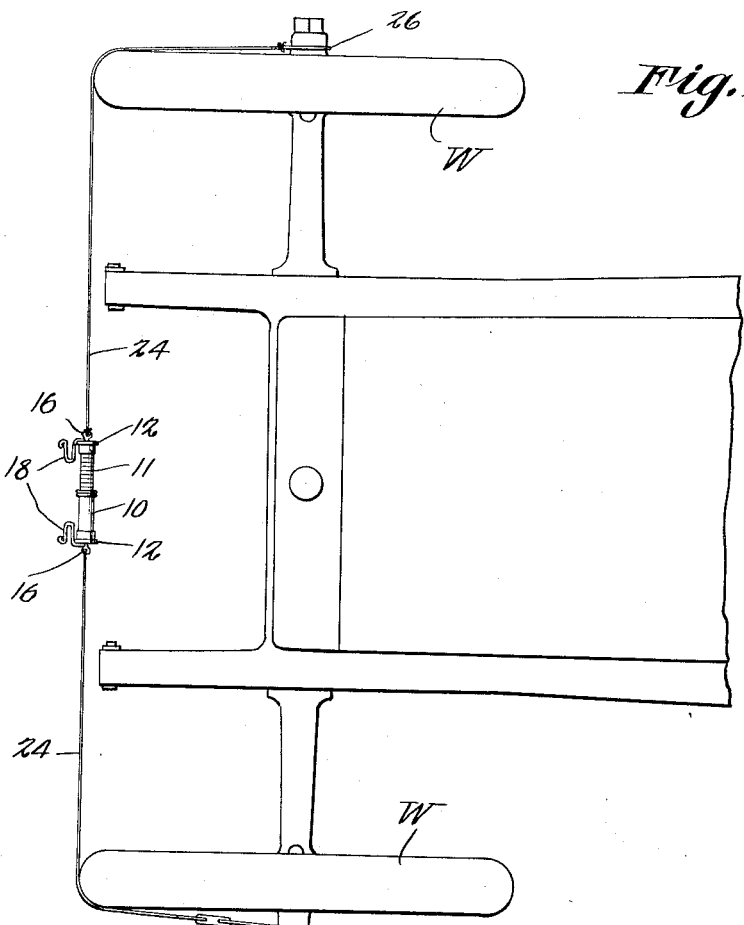
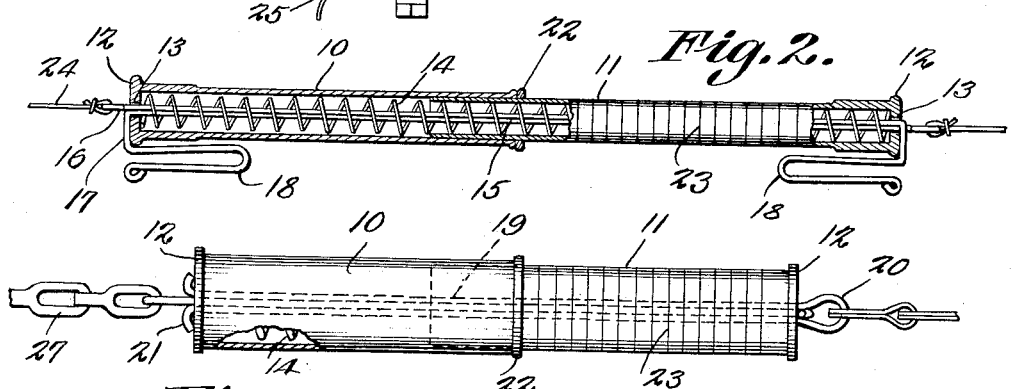
William S. Rosenfeld Inventor,
By E. Walton Brewington
Attorney.

Patented Apr. 19, 1927.

1,625,431

UNITED STATES PATENT OFFICE.

WILLIAM S. ROSENFELD, OF BALTIMORE, MARYLAND.

ALIGNMENT DEVICE FOR AUTOMOBILE WHEELS.

Application filed December 16, 1926. Serial No. 155,150.

This invention relates to measuring devices and has special reference to an indicator for measuring the toe-in of automobile steering wheels.

One important object of the invention is to provide a simple and efficient indicator of improved and novel construction provided with a spring gauge and adapted to be applied to the front or steering wheels of an automobile for indicating the extent of the toe-in of such wheels, it may also be used on the rear wheels for the purpose of indicating the alignment as well as the front wheels.

A second important object of the invention is to provide an improved device of this character having novel registering means whereby the extent of toe-in is indicated on the device and which is so compact that it may be conveniently carried in one's vest pocket.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and—

Figure 1 is a plan view of the front part of an automobile showing the device applied thereto.

Figure 2 is a longitudinal section through one form of indicator used with the invention.

Figure 3 is a side elevation of a second and slightly different form of indicator.

In the embodiment of the invention herein illustrated the indicator comprises an outer sleeve 10 into one end of which slides an inner sleeve 11, the remote ends of these sleeves being closed by closures 12 each having a centrally disposed opening 13 therein. These sleeves are constantly urged to expanded position by a coil spring 14 held in the sleeve and bearing against the respective ends 12. In the form shown in Figure 2 a pair of rods or wires 15 extend through these sleeves passing out of the openings 13 and on each wire is an eye 16 at one end, the other end bent over the head or closure 12 as at 17 and provided with a hook like cord holder 18 arranged along side of the respective sleeve. It will be noted from Figure 2 that the eyes 16 of the two wires 15 are disposed at opposite ends of the instrument. In the form shown in Figure 3 doubled wires 19 are similarly passed through the two heads or closures and each of these wires is provided with an eye 20 at its doubled portion and has its end 21 turned over on the outside of the respective head 12. On each of the inner tubes 11 is mounted a sliding ring 22 and these inner tubes in both forms are graduated with suitable lines 23 indicating appropriate fractions of an inch or other linear measurements. In the form shown in Figure 2 the eyes 16 have cords 24 attached thereto and on one end of these cords is a takeup 25 while the other cord is provided with a loop 26. The form in Figure 3 is much like this except that the cords are replaced by suitable chains 27.

In use the loop 26 is slipped around the hub of one of the front wheels W of the automobile, while the loop formed by the takeup 25 is slipped around the other hub, the cords being run over the extreme forward portions of the wheels W. The automobile is moved forward, the cords 24 having been taut, until the front wheels are rotated through approximately 180 degrees. Due to the toeing in of the front wheels the tubes will telescope inwardly, the ring 22 which has rested against the open end of the tube 10 being pushed along the tube 11. Then the wheels may be reversely rotated to bring the indicator to its original position whereupon the indicator will again expand and the ring 22 be moved outwardly and away from the tube 10 by its frictional engagement on the tube 11 so that the position of the ring indicates the difference in distance between the front and rear portions of the wheels W, thus enabling them to be set to the proper angles in case they are not already properly adjusted. Obviously the indicator need not necessarily be located centrally in front of the automobile but may just as conveniently be located either toward the right or left. In storing the device the cords 24 are wound on the hooks 18.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a pair of tubes each having an open end and a closed end provided with a centrally disposed opening, the open ends of said tubes being telescopically connected one within the other, a coil spring in said tubes urging them to expanded position, wires, each having an eye on one end and extending through the openings in the closed ends of said tubes and through the tubes, said wires having their other ends bent to lie against said closed ends at the ends opposite the respective eyes, and flexible strands each having one end connected to one of the respective eyes and having its other end provided with means for attachment to an automobile wheel hub.

2. In a device of the kind described, a pair of tubes each having an open end and a closed end provided with a centrally disposed opening, the open ends of said tubes being telescopically connected one within the other, a coil spring in said tubes urging them to expanded position, wires each having an eye on one end and extending through the openings in the closed ends of said tubes and through the tubes, said wires having their other ends bent to lie against said closed ends at the ends opposite the respective eyes, flexible strands each having one end connected to one of the respective eyes and having its other end provided with means for attachment to an automobile wheel hub, one of said tubes constituting an inner tube and the other an outer tube, an indicator ring frictionally engaged upon the inner tube and slidable therealong, said indicator ring normally resting against the open end of the outer tube, said inner tube having graduation lines extending transversely thereof whereby the extent of movement of the ring on the inner tube may be measured.

3. In a device of the kind described, a pair of tubes each having an open end and a closed end provided with a centrally disposed opening, the open ends of said tubes being telescopically connected one within the other, a coil spring in said tubes urging them to expanded position, wires each having an eye on one end and extending through the openings in the closed ends of said tubes and through the tubes, said wires having their other ends bent to lie against said closed ends at the ends opposite the respective eyes, flexible strands each having one end connected to one of the respective eyes and having its other end provided with means for attachment to an automobile wheel hub, one of said tubes constituting an inner tube and the other an outer tube, an indicator ring frictionally engaged upon the inner tube and slidable therealong, said indicator ring normally resting against the open end of the outer tube, said inner tube having graduation lines extending transversely thereof whereby the extent of movement of the ring on the inner tube may be measured, and hooks constituting cord holders for said flexible strand and forming continuations of the bent over portions of the wires, said hooks lying substantially parallel to said tubes and opening in opposite directions.

In testimony whereof I affix my signature

WILLIAM S. ROSENFELD.